Patented June 11, 1935

2,004,646

UNITED STATES PATENT OFFICE 2,004,646

CATHODE RAY TUBE

Carl W. Becker, Allston, Mass.

Application August 18, 1932, Serial No. 629,263

3 Claims. (Cl. 250—27.5)

This invention relates to cathode ray tubes especially adapted, although not necessarily restricted, to television purposes, and to a method of making the tube and particularly of mounting the electrostatic deflecting plates thereof.

The cathode ray tube with which this invention is particularly concerned is of the type wherein deflecting plates are disposed on opposite sides of the path of the cathode rays and are adapted to be energized at variable potentials whereby to cause the rays to be deflected into positions which are functions of the potential difference between the plates. It is important that the cathode ray tube be evacuated to as high a degree as possible and to maintain the high vacuum indefinitely. Hence it is the practice to drive the occluded gases out of the deflecting plates by heating them to a suitably high temperature during the process of evacuating the tube. This heating is commonly done by disposing the tube so that its plates are within the magnetic field of a coil traversed by a high frequency current which sets up eddy currents in the plates sufficiently great to heat them red hot or to a temperature at which the occluded gases in the plates will be driven off.

Heretofore, the deflecting plates have been mounted on conducting supports, or wires, which are perpendicular to the plates and extend through and are seated in tubulations of the tube; and the high frequency heating coils necessarily have been placed about or in line with the tubulations and the supports in order to dispose the magnetic field of the coil in the most advantageous as perpendicular relation to the deflecting plates. With this arrangement the plate support is necessarily in the intense field of the heating coil and becomes rapidly heated and due to the sudden expansion caused by the rapid heating often cracks the seal about the support before the plate has been sufficiently heated. The cracking of the seal obviously spoils the tube or, if the crack is small so that a visual inspection does not readily detect it, causes a slow leakage of air into the tube which soon renders the tube worthless for its intended purpose.

Hence an object of the present invention is a method of mounting the deflecting plates of a cathode ray or equivalent tube, and a tube constructed in accordance with this method, wherein the conducting supports for the plates are so located with respect to the plates that they are out of the intense region of the magnetic field that is employed to heat and degas the plates.

Specifically it is a further object of the present invention to arrange the plate supports generally parallel with the plate so that the supports and the seals therefor with the envelope of the tube can be at one side of the intense field of the heating coil.

A further object is generally to improve the construction of cathode ray tubes.

Figure 1:
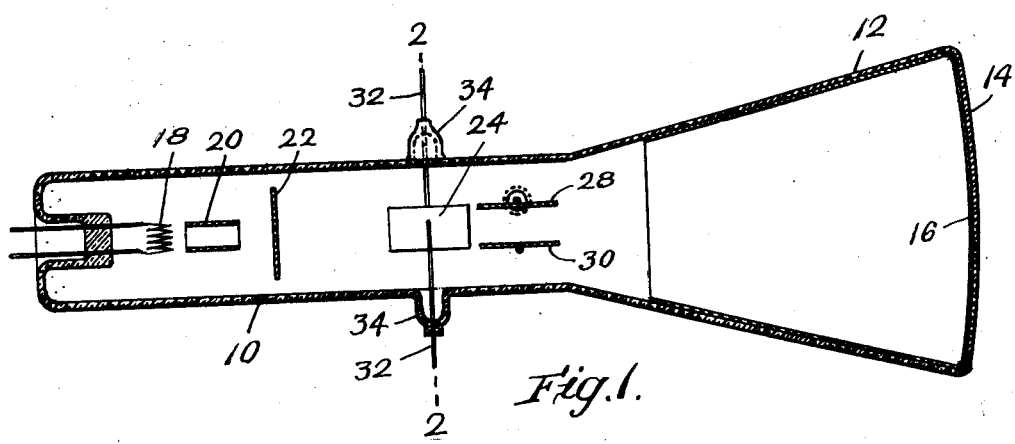
Fig. 1 is a plan view more or less diagrammatically illustrated of a cathode ray tube embodying the present invention.
Figure 2:
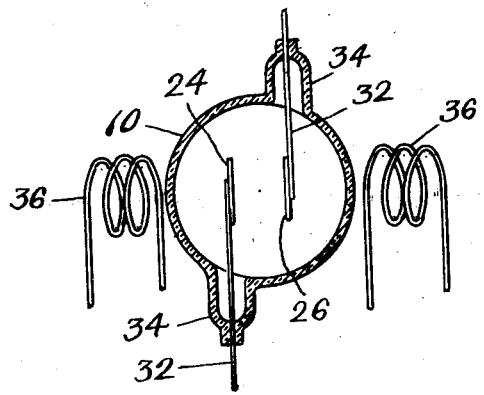
Fig. 2 is a section of the tube taken along line 2—2 of Fig. 1.

The cathode ray tube embodying the present invention has usually a glass envelope provided with a cylindrical portion or neck 10 communicating at one end with a flaring or conical portion or bell 12 having an end wall 14 and provided with an inner coating or screen 16 of suitable material by which the trace of the cathode rays is made visible. The tube is provided with the usual cathode 18, herein shown as a heated filament, the usual grid 20, and the usual apertured anode 22. The circuit connections of the cathode, grid and anode are not necessarily illustrated nor is their manner of support. The tube between the anode and the viewing end of the tube is also provided with two sets of deflecting plates, one set comprising the parallel spaced plates 24 and 26 and the other set comprising similar parallel spaced plates 28 and 30, the plates 28 and 30 being arranged at right angles to the plates 24 and 26. The plates of said sets are adapted to be energized in the usual manner at different and variable potentials for the purpose of deflecting the electron beam in directions that are right angles to each other so that the position of the visible spot on the end of the tube can be displaced into positions that are, at any time, functions of the potentials of said plates. Each deflecting plate is secured as by being welded to a conducting support or wire 32 which passes through and out of a tubulation 34 of the envelope of the tube and is sealed in said tubulation, the wire 32 and the tubulation constituting the support for the plate. In accordance with the present invention the wire 32 is generally parallel with the plate and extends away therefrom and through the envelope at right angles to the line between the plates instead of lying in said line as has been the usual practice heretofore. In evacuating the tube and degasing the plates heating coils 36 which are adapted to be traversed by a high frequency current are disposed in confronting relation with the plates so that a high frequency magnetic field is set up in the zones of and perpendicular to the plates thereby to cause the plates to become sufficiently highly heated to drive off the occluded gases. Since, however, the conducting supports are extended transversely of the magnetic field between the coils and since the seals between the supports and the tubulations are out of the intense region of the magnetic field no deleterious amount of heating of the supports takes place at the seals and hence there is no danger of cracking the seals and impairing the vacuum during the process of degasing the plates.

I claim:

1. A cathode ray tube having an envelope comprising a tubular neck and an enlarged bell at one end of the neck, a screen at the end of said bell, means including a cathode and an anode at the other end of said neck for projecting a cathode ray on said screen, opposed flat and parallel electrostatic ray-deflecting plates disposed in said neck between said anode and screen and on opposite sides of and parallel with the path of said ray for deflecting it, and conducting supports which carry said plates and are extended generally parallel with said plates and generally at right angles with the axis of said envelope away from said plates and through the envelope of said tube and are sealed in said envelope out of the line passed between said plates.

2. A cathode ray tube having an envelope comprising a tubular neck and an enlarged bell at one end of the neck, a screen at the end of said bell, means including a cathode and an anode at the other end of said neck for projecting a cathode ray on said screen, opposed flat and parallel electrostatic ray-deflecting plates disposed on opposite sides of and parallel with the path of said ray for deflecting it, said envelope having tubulations which are generally parallel with the planes of said plates and at right angles with the axis of the envelope, and conducting supports which carry said plates and which extend at right angles with the axis of the envelope through and are sealed in said tubulations and are generally parallel with the planes of said plates.

3. The method of degasing the electrostatic deflecting plates of a cathode ray tube having plate conductors extended through and sealed in the tube envelope, which method consists in subjecting the plates to the action of a high frequency magnetic plate-heating field and excluding said field from the region of the seals between said envelope and said conductors by positioning the field at right angles to the conductors and to the axis of the tube.

CARL W. BECKER.